(12) United States Patent
Simmonds et al.

(10) Patent No.: US 7,907,342 B2
(45) Date of Patent: Mar. 15, 2011

(54) PROJECTION DISPLAY

(75) Inventors: Michael David Simmonds, Faversham (GB); Richard Keith Howard, Walderslade (GB)

(73) Assignee: BAE Systems PLC, London (GB)

( * ) Notice: Subject to any disclaimer, the term of this patent is extended or adjusted under 35 U.S.C. 154(b) by 561 days.

(21) Appl. No.: 11/628,421

(22) PCT Filed: Sep. 5, 2006

(86) PCT No.: PCT/GB2006/050273
§ 371 (c)(1),
(2), (4) Date: Nov. 30, 2006

(87) PCT Pub. No.: WO2007/029034
PCT Pub. Date: Mar. 15, 2007

(65) Prior Publication Data
US 2008/0285137 A1   Nov. 20, 2008

(30) Foreign Application Priority Data

Sep. 7, 2005 (EP) .................................... 05270052
Sep. 7, 2005 (GB) .................................. 0518190.4

(51) Int. Cl.
*G02B 27/14* (2006.01)
*G09G 5/00* (2006.01)
(52) U.S. Cl. .......................................... 359/630; 345/7
(58) Field of Classification Search .......... 359/630–634; 345/7–9; 362/600, 616, 618, 551, 558, 623
See application file for complete search history.

(56) References Cited

U.S. PATENT DOCUMENTS

| 5,668,913 | A  | * | 9/1997 | Tai et al. ........................ 362/615 |
| 6,796,669 | B2 | * | 9/2004 | Masuda ........................ 362/616 |
| 2004/0130797 | A1 | | 7/2004 | Travis |
| 2005/0180687 | A1 | | 8/2005 | Amitai |

FOREIGN PATENT DOCUMENTS

WO   WO 2004/109349 A3   12/2004

* cited by examiner

*Primary Examiner* — Alicia M Harrington
(74) *Attorney, Agent, or Firm* — Scully, Scott, Murphy & Presser, P.C.

(57) ABSTRACT

A projection display is provided including a rod-like waveguide (7), an image providing light source device (10) located at a first side (9) of the waveguide (7) to inject image bearing light into the waveguide (7), through the first side (9). An input means (12) is provided on the waveguide (7) adjacent one end (13) at a second side (14) opposite to the first side (9) to reflect the image bearing light internally along the waveguide (7). An output transmission grating (18) is provided along a third side (19) of the waveguide (7) through which image bearing light is outputted from the waveguide (7). A plate-like waveguide (8) is located with an edge surface (23) thereof adjacent to and in line with the third side (19) of the waveguide (7) to receive the image bearing light from the waveguide (7). The waveguide (8) includes an exit grating (25) on or at a first surface (26) thereof for diffracting the received image bearing light out of the waveguide (8) towards a viewer (6).

19 Claims, 3 Drawing Sheets

PROJECTION DISPLAY

This invention relates to a projection display for displaying an image to a viewer which is particularly, but not exclusively, suitable for use in a head up display, a helmet mounted display or a head mounted display.

Traditionally head up displays, which may be used in an aircraft, as shown in FIG. 1 of the accompanying drawings, use a convention spherical lens system 1 to generate a collimated display from an image provider such as a cathode ray tube 2. The light rays emanating from the spherical lens system 1 are reflected by a conventional fold mirror 3 through a spherical exit lens system 4 and from there passed to a combiner 5 from which the image is reflected to provide a collimated display to the viewer 6 such as a pilot of an aircraft. Thus with these conventional displays the collimating optics used, that is the spherical lens system 1 and spherical exit lens system 4 are unnecessarily large and bulky which is undesirable. For example a thirty degree field of view to be displayed to the viewer 6 may require a six inch diameter exit lens system 4. This means that the physical size of the conventional head up display as shown in FIG. 1, which includes the combiner 5 for overlaying the projected display to be viewed by a viewer 6 looking through the combiner 5, may limit the use of such a head up display in a cockpit area with insufficient space to accommodate such a head up display.

There is thus a need for a projection display which is smaller in size than conventional in order to fit into smaller spaces and thus be more suitable for restricted space environments such as an aircraft cockpit, a helmet mounted display or a head mounted display.

According to a first aspect of the present invention there is provided a projection display for displaying an image to a viewer, including a rod-like substantially rectangular cross-section waveguide made of light transmissive material, an image-providing light source device arranged to inject image bearing light into the rod-like waveguide, an input means coupled to or within the rod-like waveguide to direct said image bearing light internally along the rod-like waveguide, an output transmission grating provided along a longitudinal side of the rod-like waveguide through which the image bearing light is outputted from the rod-like waveguide, and a plate-like waveguide made of light transmissive and transparent material located with an edge surface thereof adjacent to and in line with the longitudinal side of the rod-like waveguide to receive the image bearing light therefrom, which plate-like waveguide includes an exit grating on or at a first surface thereof for diffracting the received image bearing light out of the plate-like waveguide. Preferably, the image bearing light exiting the plate-like waveguide is directed towards a viewer.

It will be understood that the term substantially rectangular cross-section also includes square in cross-section.

Preferably, the rod-like waveguide may include therein a series of semi-reflecting parallel surfaces or holographic layers located substantially parallel to the longitudinal sides of the rod-like waveguide and may be operable to split each impinging ray of the injected image bearing light into two parts at each interaction. In this manner, display uniformity at the output grating is improved and the image bearing light is multiplied.

Conveniently, the input means may be located adjacent one end of the rod-like waveguide and the rod-like waveguide may include therein or thereon a pair of spaced apart matching reflection means located one at or adjacent to a first side which is perpendicular to said longitudinal side and the other at or adjacent to a second side which is perpendicular to said longitudinal side and opposite said first side, the pair of spaced apart matching reflection means also being located to an end of the rod-like waveguide remote from the input means, which pair of spaced apart matching reflection means being arranged to reflect incident rays of image bearing light back along the rod-like waveguide without changing their propagation angles.

Advantageously, the light transmissive material from which the rod-like waveguide or the light transmissive and transparent material from which plate-like waveguide may be made of glass or plastics.

In this manner, a viewer is able to look through at least part of the material of the plate-like waveguide and the material will also be capable of transmission of image bearing light received from the rod-like waveguide. It will also be understood, that the user may or may not be able to see through the material of the rod-like waveguide depending on the configuration of the projector display and its location.

Preferably, the image providing light source device may include an image generating light source.

Conveniently, the projection display may include an optical means, located between the image generating light source and the rod-like waveguide, operable to collimate light received from the image generating light source and to inject the collimated image bearing light into the rod-like waveguide.

Advantageously, the input means may be such that incident inputted image bearing light is diffracted therefrom with the incidence angle of the diffracted light at internal surfaces of the rod-like waveguide being greater than the critical angle for the material from which the rod-like waveguide is made. In this manner, the diffracted light propagates internally within the rod-like waveguide and is reflected at said internal surfaces of the rod-like waveguide.

Preferably, the output transmission grating may be a low efficiency grating.

Conveniently, the projection display may include a light reflective coating provided on a side of the rod-like waveguide opposite to the longitudinal side to reflect back to the output transmission grating light incident thereon. In this manner, the display efficiency is increased.

Advantageously, the plate-like waveguide may include a series of semi-reflecting parallel surfaces or holographic layers located therein substantially perpendicularly to the edge surface thereof, operable to split each impinging ray of received multiplied image bearing light into a plurality of parallel rays. In this manner, the uniformity of the display at the exit grating is improved.

Preferably, the plate-like waveguide may include a narrow band selective reflection coating provided on a second surface of the plate-like waveguide opposite to and parallely spaced from the first surface thereof to reflect light diffracted from the exit grating back to the exit grating. Thereby increasing display efficiency.

Conveniently, the semi-reflecting parallel surfaces or holographic layers may be such as to co-operate to generate a multiplicity of overlapping display images.

Advantageously, at least the first and second surfaces of the rod-like waveguide may be curved.

Preferably, at least the first and second surfaces of the plate-like waveguide may be curved.

The input means may be arranged to inject image bearing light via reflective or transmissive or refractive means.

The projection display may form part of a Head Up Display, a Helmet Mounted Display or a Head Mounted Display.

The invention will now be described by way of example only, with reference to the accompanying drawings, in which.

A projection display for displaying an image to a viewer 6 according to the invention as illustrated in FIGS. 2 to 6 of the accompanying drawings in general uses waveguiding techniques to generate a collimated display subtending a large exit pupil at the point of viewer 6 and a large field of view while using a small image-providing light source device. As illustrated, the projection display of the invention uses a rod-like substantially rectangular cross-section waveguide 7 made of light transmissive material such as glass or plastics and a plate-like waveguide 8 made from a light transmissive and transparent material such as glass or plastics.

Figure 1:
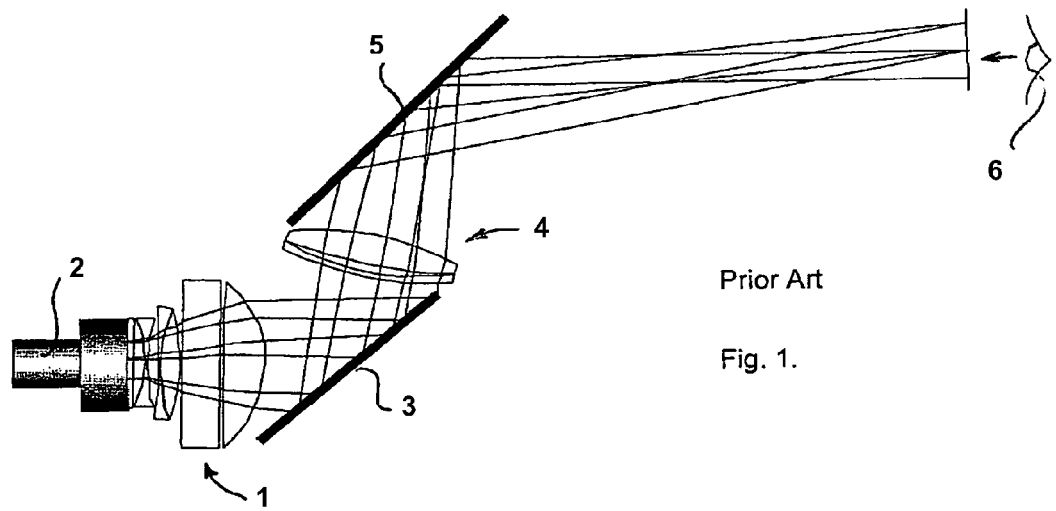
FIG. 1 is a schematic illustration of a prior art conventional projection display in the form of a head up display.
Figure 2:
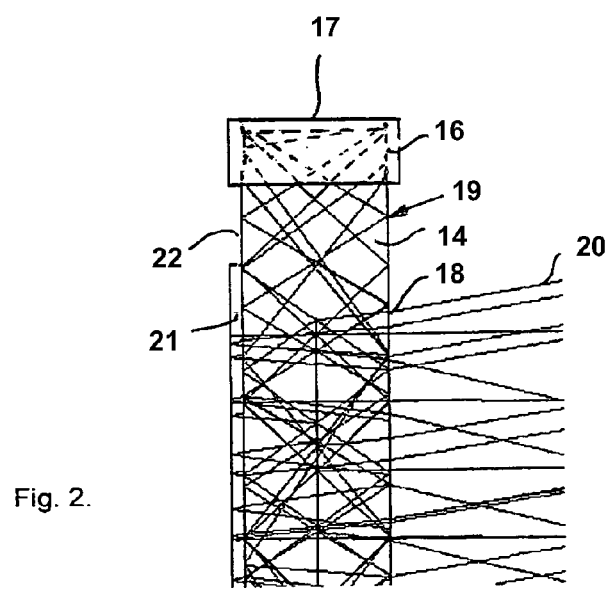
FIG. 2 is a partial view to an enlarged scale taken in the direction A of a projection display according to the present invention as illustrated in FIG. 3.
Figure 3:
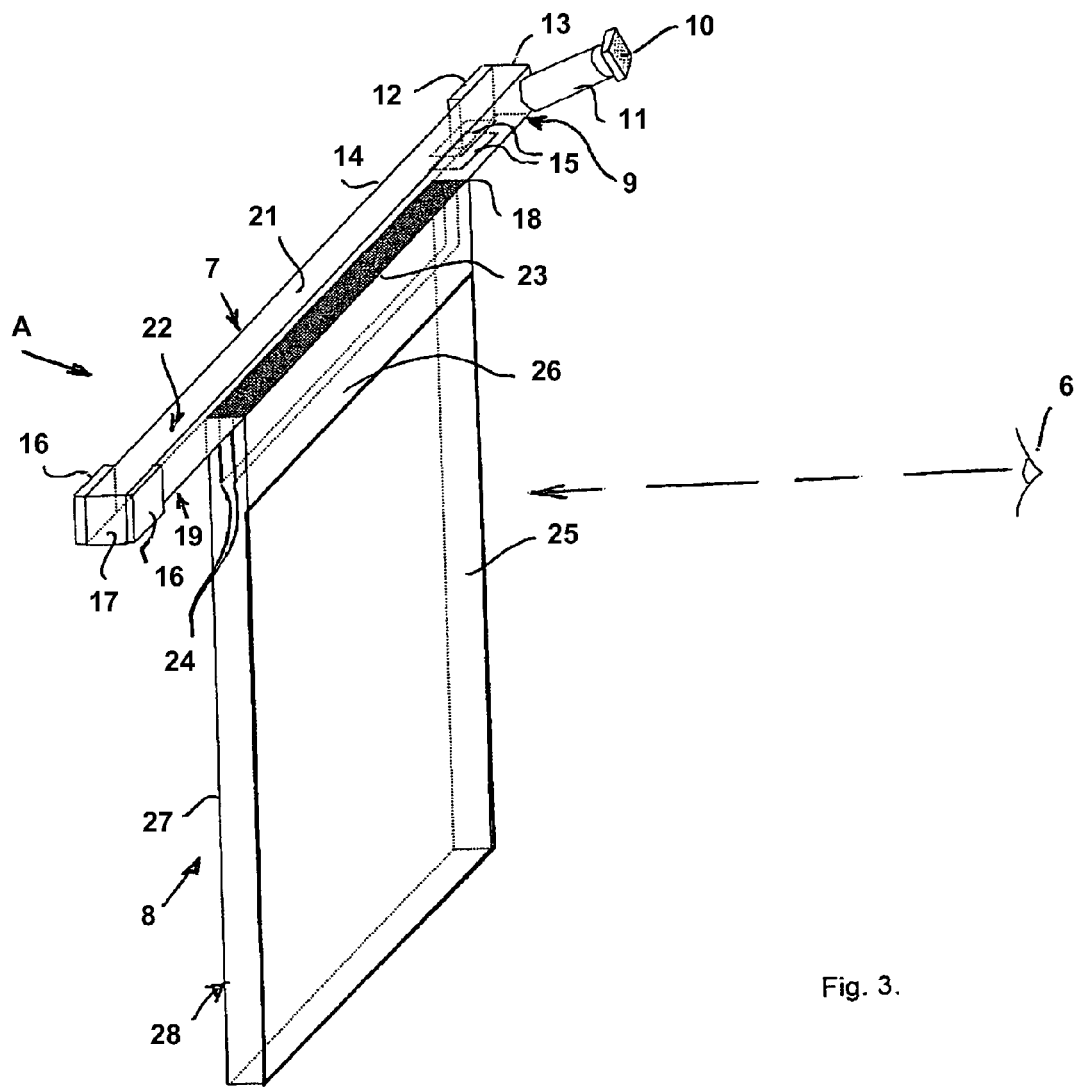
FIG. 3 is a perspective view of a projection display according to an embodiment of the present invention.

In more detail, a projection display according to one aspect the present invention as illustrated in FIGS. 2 and 3, wherein like references have been used to indicate similar integers in both FIGS. 2 and 3, additionally includes an image-providing light source device located at a first side 9 of the rod-like waveguide to inject image bearing light into the rod-like waveguide 7 through the first side 9.

The image-providing light source device includes an image generating light source 10 preferably in the form of a micro-display to provide a display of information. Additionally the image-providing light source device includes an optical means 11 located between the image generating light source 10 and the first side 9 of the rod-like waveguide 7. The optical means 11 is operable to collimate light received from the image generating light source 10 and inject the collimated image bearing light into the rod-like waveguide 7 through the first side 9 thereof. The optical means 11 preferably is of a small size, typically less than 25 millimeters in diameter, and is used to collimate the light received from the image generating light source 10. The collimated light produced by the optical means 11 has a small exit pupil and is therefore fed into the rod-like waveguide 7 which performs the function of stretching the horizontal pupil. The output from the rod-like waveguide 7 is fed into the plate-like waveguide 8 which stretches the vertical pupil view and also acts as a combiner for the display. In this manner, the display information provided to the viewer 6 looking through the plate-like waveguide 8 subtends a large exit pupil and a large field of view whilst using a small optical means 11 and a small image generating light source 10 such as a micro display. This enables the projection display of the invention to be very compact in comparison with conventional displays.

The information to be provided to the viewer 6 is in the form of a display of information which is generated by the image generating light source 10 that is illuminated with visible monochromatic laser light. The micro-display forming the image generating light source 10 may be either reflective or transmissive such that in conjunction with the optical means 11 a collimated image of the display is generated for injection into the rod-like waveguide 7. Alternatively, but not illustrated, collimation may be carried out at the waveguide 8.

In this embodiment, the rod-like waveguide 7 includes an input means such as an input reflection hologram 12 provided on or in the rod-like waveguide 7 adjacent one end 13 thereof at a second side 14 opposite to and spaced from the first side 9 to reflect and multiply the image bearing light received from the optical means 11 internally along the rod-like waveguide 7. In effect, the light impinging on the hologram 12 diffracts therefrom such that the incidence angle of the light of the internal surfaces of the rod-like waveguide 7 is greater than the critical angle for the material such as glass from which the waveguide 7 is made. Preferably the spatial frequency of the reflection hologram 12 is such as to constrain the required angular range beyond the critical angle of the material such as glass from which the waveguide 7 is made. This light is constrained within the waveguide 7 to propagate along the rod-like waveguide 7 reflecting from each side in turn. Thus the relative field angles of the light incident on the rod-like waveguide 7 at the first side 9 are preserved within the waveguide and the information required to regenerate the original image is thus preserved.

The rod-like waveguide 7 also includes therein a series of semi-reflecting parallel surfaces or holographic layers 15 located substantially perpendicularly to the first and second sides 9 and 14 as can be seen in FIG. 3 of the accompanying drawings. The surfaces or layers 15 are operable to split each impinging ray of the injected image bearing light into two parts at each interaction to improve display uniformity at an output grating and to multiply the image bearing light. The net result is that for each ray of light inputting the region of the surfaces or layers 15 many rays exit. The system efficiency is further improved by a pair of spaced apart matching reflection means such as matching reflection holograms 16 provided therein or thereon and located one at or adjacent to the first side 9 and the other at or adjacent to the second side 14 and adjacent to an end 17 of the waveguide 7 remote from the input coupling reflection hologram 12. The pair of spaced apart matching reflection holograms 16 are such as to reflect incident rays of image bearing light back along the rod-like waveguide 7 without change in their propagation angles thereby preserving the image information. Light absorption material is provided at the end 17 of the waveguide 7 to absorb any light reaching the end 17.

An output transmission grating 18 is provided along a longitudinal third side 19 of the waveguide 7 through which grating 18 the image bearing light is outputted from the rod-like waveguide 7 as shown at 20 in FIG. 2 of the accompanying drawings. The grating 18 is a low efficiency grating which diffracts a small amount of light out of the waveguide 7 on each interaction with the incident light rays. This grating 18 preferably is only a few percent efficient and light diffracted by the grating is allowed to escape from the waveguide 7. A light reflective coating 21 is provided on a fourth side 22 of the rod-like waveguide 7 opposite to the longitudinal third side 19 to reflect back to the output transmission grating 18 light incident thereon. Thereby increasing the display efficiency.

The plate-like waveguide 8 is located with an edge surface 23 thereof adjacent to and in line with the third side 19 of the waveguide 7 to receive the image bearing light therefrom. The edge surface 23 is located adjacent and close to, but not touching, the third side 19 of the waveguide 7. The waveguide 8 includes a series of semi-reflecting parallel surfaces or holographic layers 24 located therein substantially perpendicularly to the edge surface 23 and operable to split each impinging ray of image bearing light received from the output transmission grating 18 of the waveguide 7 into a plurality of parallel rays which are larger than the critical angle for the material from which the waveguide 8 is made and therefore will propagate inside the waveguide 8. This helps to improve the uniformity of the display at an exit grating 25 on or at a first surface 26 of the waveguide 8 for diffracting the received image bearing light out of the waveguide 8 towards a viewer

6. The grating 25 is a low efficiency grating, such that as rays propagate along the waveguide 8 at each interaction with the exit grating 25 a small proportion of light is diffracted out of the waveguide 8. The non-diffracted light continues to propagate. A large number of parallel rays therefore exit the waveguide 8 through the exit grating 25 towards the viewer 6, which originated at discrete points on the micro-display forming the image generating light source 10.

It will be understood that the exit grating 25 not only diffracts light towards the viewer 6 but also diffracts light away from the viewer 6. Preferably, a narrow band selective reflection coating 27 is provided on a second surface 28 of the waveguide 8 opposite to and parallely spaced from the first surface 26 to reflect light diffracted from the exit grating 25 back to the exit grating 25 to increase display efficiency. Preferably, the semi-reflecting parallel surfaces or holographic layers 24 and/or the formation of the exit grating 25 are such as to co-operate to generate a multiplicity of overlapping display images. To this end the exit grating 25 can be provided not only at the first surface 26, but may be duplicated within the body of the waveguide 8 and additionally at the second surface 28 thereof.

Although the first and second surfaces 9, 14 of the waveguide 7 and the first and second surfaces 26, 28 of the waveguide 8 have been shown as planar in the illustrated embodiment of the invention these can be made curved if desired.

Figures 4, 5, 6:
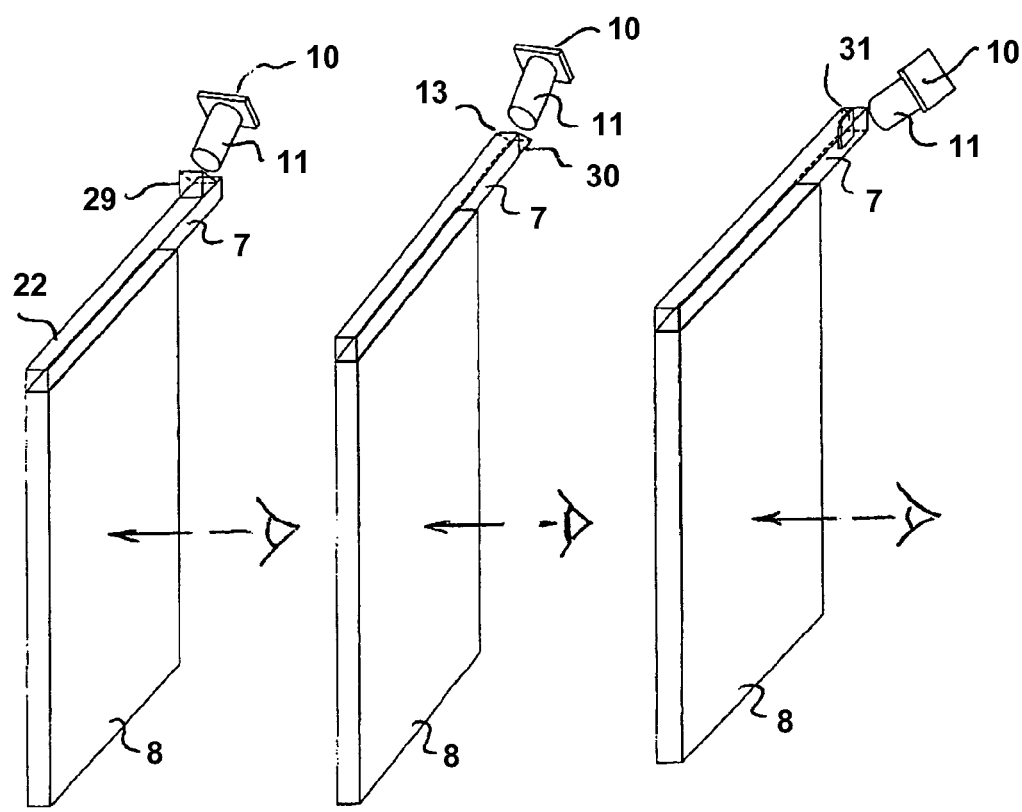
FIGS. 4, 5 and 6 are perspective views of projection displays according to alternative embodiments of the present invention.

FIGS. 4, 5 and 6 illustrate alternative embodiments of the present invention, wherein like references have been used to indicate similar integers as those used in Figures to 2 and 3.

In the embodiment of FIG. 4, there is provided an alternative arrangement for injecting image bearing light into waveguide 7 having an image generating light source 10 and optical means 11 arranged to inject the image bearing light via an input prism 29 into the fourth side 22 of the rod-like waveguide 7. In this manner, the image bearing light is refractively injected into the rod-like waveguide 7 as opposed to reflectively injected as illustrated with reference to FIG. 3.

Similarly, FIG. 5 illustrates another alternative embodiment, wherein there is provided a further alternative arrangement for injecting image bearing light into waveguide 7 having an image generating light source 10 and optical means 11 arranged to inject the image bearing light via an input prism 30 located at end 13 of the rod-like waveguide 7. It will also be understood that prism 30 could be integral with the rod-like waveguide 7 and comprise a polished face on the rod-like waveguide 7 at end 13 having a compound angle. In this manner, the image bearing light is refractively injected into the rod-like waveguide 7 as opposed to reflectively injected as illustrated with reference to FIG. 3.

FIG. 6 illustrates a further alternative embodiment of the present invention, wherein there is provided an alternative arrangement for injecting image bearing light into waveguide 7 having an image generating light source 10 and optical means 11 arranged to inject the image bearing light into the first side 9 of the rod-like waveguide 7 where upon a semi reflective surface or hologram 31 arranged parallel to first side 9 and within the material of rod-like waveguide 7 is arranged to transmissively direct the image bearing light along the waveguide 7. In this manner, the image bearing light is transmissively injected into the rod-like waveguide 7 as opposed to reflectively injected as illustrated with reference to FIG. 3 or refractively injected as illustrated with reference to FIG. 4 or 5.

Additionally, the projection display illustrated according to the invention can form part of a Head Up Display, of a Helmet Mounted Display and/or of a Head Mounted Display particularly for aircraft usage.

What is claimed is:

1. A projection display for displaying an image to a viewer, including a rod-like substantially rectangular cross-section waveguide made of light transmissive material, an image-providing light source device arranged to inject image bearing light into the rod-like waveguide, an input means coupled to or within the rod-like waveguide to direct said image bearing light to propagate internally along the rod-like waveguide reflecting from each of the four sides of the waveguide in turn, an output transmission grating provided along a longitudinal side of the rod-like waveguide through which the image bearing light is outputted from the rod-like waveguide, and a plate-like waveguide made of light transmissive and transparent material located with an edge surface thereof adjacent to and in line with the longitudinal side of the rod-like waveguide to receive the image bearing light therefrom, which plate-like waveguide includes an exit grating on or at a first surface thereof for diffracting the received image bearing light out of the plate-like waveguide.

2. A projection display according to claim 1, wherein the rod-like waveguide includes therein a series of semi-reflecting parallel surfaces or holographic layers located substantially parallel to the longitudinal side of the rod-like waveguide and operable to split each impinging ray of the injected image bearing light into two parts at each interaction.

3. A projection display according to claim 2, wherein the semi-reflecting parallel surfaces or holographic layers are such as to co-operate to generate a multiplicity of overlapping display images.

4. A projection display according to claim 1, wherein the input means is located adjacent one end of the rod-like waveguide and the rod-like waveguide includes therein or thereon a pair of spaced apart matching reflection means located one at or adjacent to a first side which is perpendicular to said longitudinal side and the other at or adjacent to a second side which is perpendicular to said longitudinal side and opposite said first side, the pair of spaced apart matching reflection means also being located to an end of the rod-like waveguide remote from the input means, which pair of spaced apart matching reflection means being arranged to reflect incident rays of image bearing light back along the rod-like waveguide without change in their propagation angles.

5. A projection display according to claim 4, wherein at least the first and second surfaces of the rod-like waveguide are curved.

6. A projection display according to claim 1, wherein the light transmissive material from which the rod-like waveguide or light transmissive and transparent material from which the plate-like waveguide are made is glass or plastics.

7. A projection display according to claim 1, wherein the image providing light source device includes an image generating light source.

8. A projection display according to claim 7, including an optical means located between the image generating light source and the rod-like waveguide, operable to collimate light received from the image generating light source and to inject the collimated image light bearing light into the rod-like waveguide.

9. A projection display according to claim 1, wherein the input means is such that incident inputted image bearing light is diffracted therefrom with the incidence angle of the diffracted light at internal surfaces of the rod-like waveguide being greater that the critical angle for the material from which the rod-like waveguide is made.

10. A projection display according to claim 1, wherein the output transmission grating is a low efficiency grating.

11. A projection display according to claim 10, wherein a light reflective coating is provided on a side of the rod-like waveguide opposite to the longitudinal side to reflect back to the output transmission grating image bearing light incident thereon.

12. A projection display according to claim 1, wherein the plate-like waveguide includes a series of semi-reflecting parallel surfaces or holographic layers located therein substantially perpendicularly to the edge surface thereof, operable to split each impinging ray of received multiplied image bearing light into a plurality of parallel rays.

13. A projection display according to claim 12, wherein the semi-reflecting parallel surfaces or holographic layers are such as to cooperate to generate a multiplicity of overlapping display images.

14. A projection display according to claim 1, wherein the plate-like waveguide includes a narrow band selective reflection coating provided on a second surface of the plate-like waveguide opposite to and parallely spaced from the first surface thereof to reflect light diffracted from the exit grating back to the exit grating.

15. A projection display according to claim 1, wherein at least the first and second surfaces of the plate-like waveguide are curved.

16. A projection display according to claim 1, wherein the input means is arranged to inject image bearing light via reflective, or transmissive, or refractive means.

17. A Head Up Display including a projection display according to claim 1.

18. A Helmet Mounted Display including a projection display according to claim 1.

19. A Head Mounted Display including a projection display according to claim 1.

* * * * *